United States Patent [19]

Millar et al.

[11] Patent Number: 4,667,862

[45] Date of Patent: May 26, 1987

[54] CLEAVING APPARATUS AND METHOD

[75] Inventors: Colin A. Millar, Felixstowe; David Talbott; David J. Potter, both of Ipswich; Thomas D. S. Wood, Woodbridge, all of England

[73] Assignee: British Telecommunications plc, United Kingdom

[21] Appl. No.: 791,141

[22] PCT Filed: Feb. 8, 1985

[86] PCT No.: PCT/GB85/00053

§ 371 Date: Nov. 25, 1985

§ 102(e) Date: Nov. 25, 1985

[87] PCT Pub. No.: WO85/03502

PCT Pub. Date: Aug. 15, 1985

[30] Foreign Application Priority Data

Feb. 9, 1984 [GB] United Kingdom ............... 8403440

[51] Int. Cl.[4] ............................................. C03B 37/16
[52] U.S. Cl. .......................................... 225/2; 83/586; 83/607; 225/96; 225/101
[58] Field of Search ................... 225/2, 96, 96.5, 101, 225/106; 83/355, 586, 591, 597, 607, 665

[56] References Cited

U.S. PATENT DOCUMENTS 745,965 12/1903 Lyon ..................................... 83/355
2,048,360 7/1936 Spanel et al. ..................... 83/355 X
4,557,049 12/1985 Cribbs et al. ..................... 225/96 X

FOREIGN PATENT DOCUMENTS 102805 8/1981 Japan .
2134101 8/1984 United Kingdom .

Primary Examiner—Frank T. Yost
Attorney, Agent, or Firm—Nixon & Vanderhye

[57] ABSTRACT

Apparatus for cleaving an optical fibre (115) under axial tension, is provided with a cleaver blade (116) which is mounted as part of a rotatable cleaver assembly. The assembly is balanced about its axis of rotation and, as described, comprises a wheel (117) mounted on an axle (138). The cleaver blade (116) is attached to an arm which extends radially from the wheel (117). A hair spring (304) drives the assembly. The cleaving apparatus finds particular application in cleaving monomode fibres under normal working, rather than laboratory, conditions.

37 Claims, 8 Drawing Figures

CLEAVING APPARATUS AND METHOD

FIELD OF THE INVENTION

The present invention relates to cleaving apparatus for use in the field of optical communications and particularly but not exclusively for use in the cleaving of optical fibres.

BACKGROUND OF THE INVENTION

Optical fibres generally comprise filaments of optically transparent, non-ductile, "glassy" materials, for example vitreous silica, boro-silicate, or metal fluoride glasses. To enable guided transmission to take place, the fibres require a core and a cladding. Occasionally the function of the cladding may be performed by, for example, the surrounding air. In practice, however, optical fibres employed to transmit information usually have cores and claddings.

Different types of optical fibre will have different dimensions associated with them but, generally, the outer diameter varies (with fibre type) over a range of from 60 $\mu$m to 250 $\mu$m.

When optical power is to be transmitted into or out of the end of an optical fibre, the giometric characteristics of the fibre end affect the manner in which the power is transmitted. It is often desirable that the fibre should be provided with a flat end face which lies perpendicular to the longitudinal axis of the fibre. For instance if two fibres for use in optical communications are fusion jointed, it is known that if either end face is not perpendicular, optical power loss can be significantly increased at the joint. For example, the two fibre ends may tend to ride past one another during making of the joint, leading to misalignment of the fibres. Where a major part of the optical power is carried by a fibre core this power loss can be substantial and monomode fibres are known to be particularly susceptible as a result of their small core diameters. Typically these are about 8 $\mu$m in a fibre whose overall diameter including core and cladding is in the region of 125 $\mu$m.

An acceptable fibre end face can be obtained by clamping the fibre under a controlled axial tension, free from any torsional strain, and striking it on its outermost glass surface with a cleaver blade. In known cleaving tools the cleaver blade may be mounted in a sliding cleaver which is propelled along a horizontal bearing surface to bring the blade into contact with the fibre. Alternatively the blade may be mounted on a lever which drops under the influence of gravity to bring the blade into contact with the fibre.

Problems of reliability have been encountered with such arrangements. For instance, the action of both types of arrangement can be extremely sensitive to changes in orientation, or to movement, of the cleaving tool.

SUMMARY OF THE INVENTION

It is an object of the present invention to provide a cleaving tool wherein the characterisitics of the striking action of the cleaver blade against a fibre to be cleaved are less sensitive to external influences.

According to a first aspect, the present invention provides cleaving apparatus, comprising a rotatably mounted cleaver, wherein the cleaver is balanced about its axis of rotation.

Cleaving apparatus according to the present invention lends itself in particular to cleaving optical fibres.

Conveniently, the cleaver may comprise a disc rigidly mounted on a coaxial shaft, the shaft being rotatably mounted at or near its ends.

Preferably the cleaving apparatus further comprises tensioning means for applying axial tension to an optical fibre wherein the tensioning means comprises a pair of hingedly separable optical fibre clamps.

Cleaving tools of this latter type have the advantage that both the striking action of the cleaver blade and the axial tension applied to the optical fibre tend not to be susceptible to dirty bearing surfaces.

BRIEF DESCRIPTION OF THE INVENTION

A cleaving tool according to an embodiment of the invention will now be described with reference to the drawings in which.

Figure 6A:
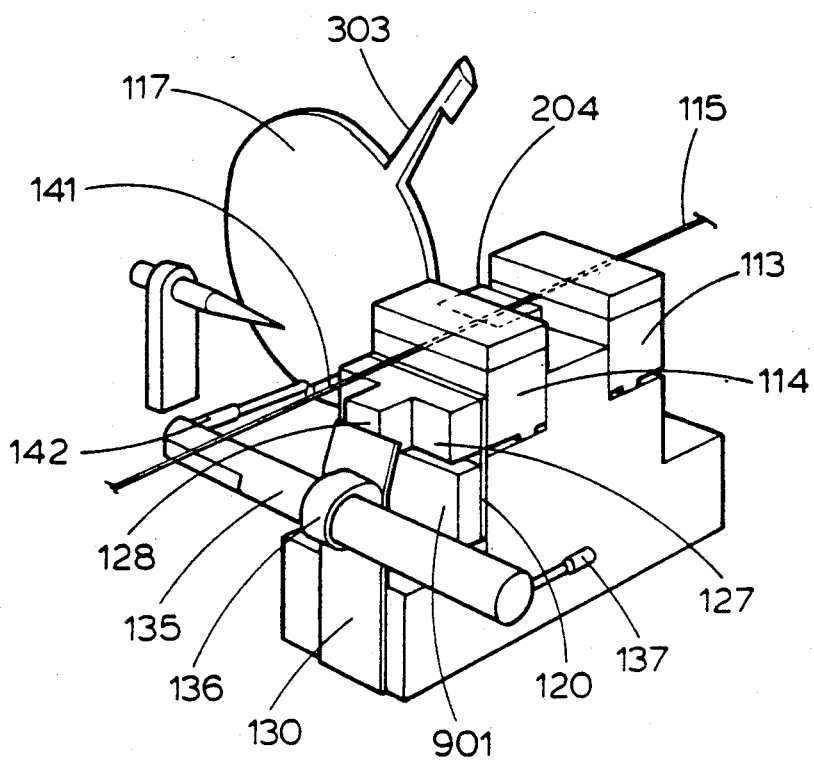
Figure 6B:
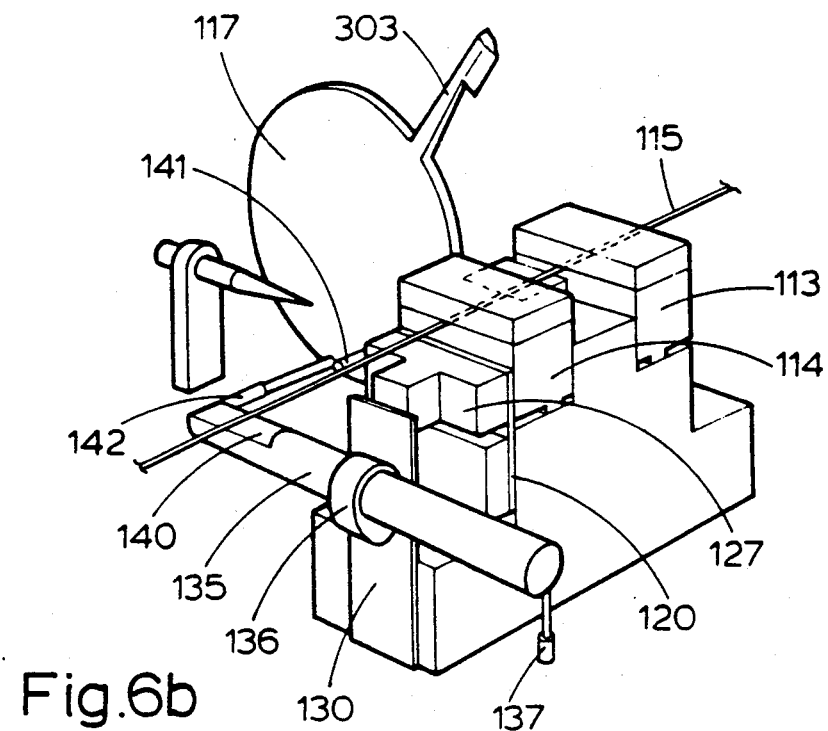
Figure 6C:
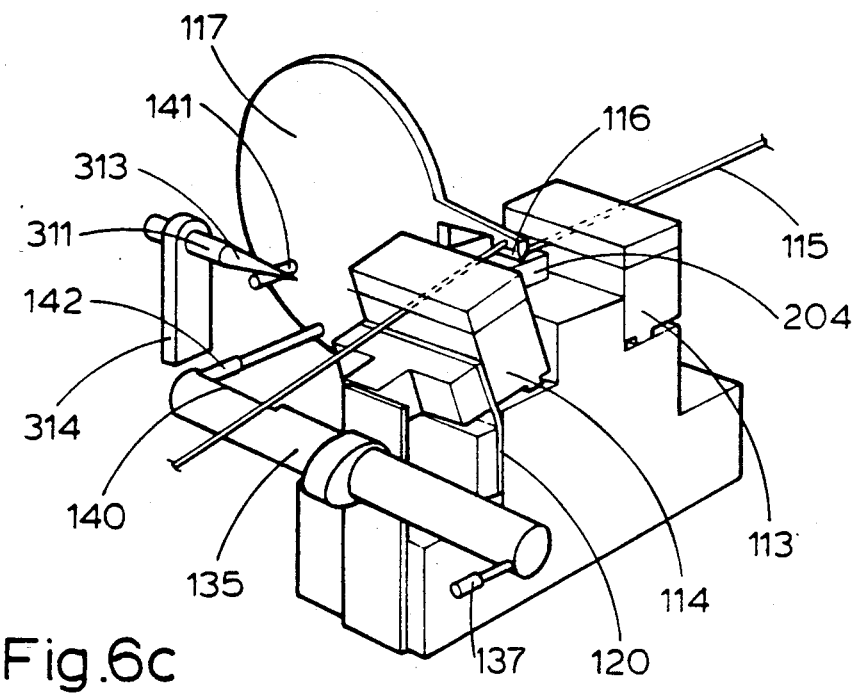

FIGS. 6a to 6c each show schematically the same perspective view of part of the cleaving tool, in order to illustrate the tool at three different stages during a cleaving operation.

DETAILED DESCRIPTION

Figure 1:
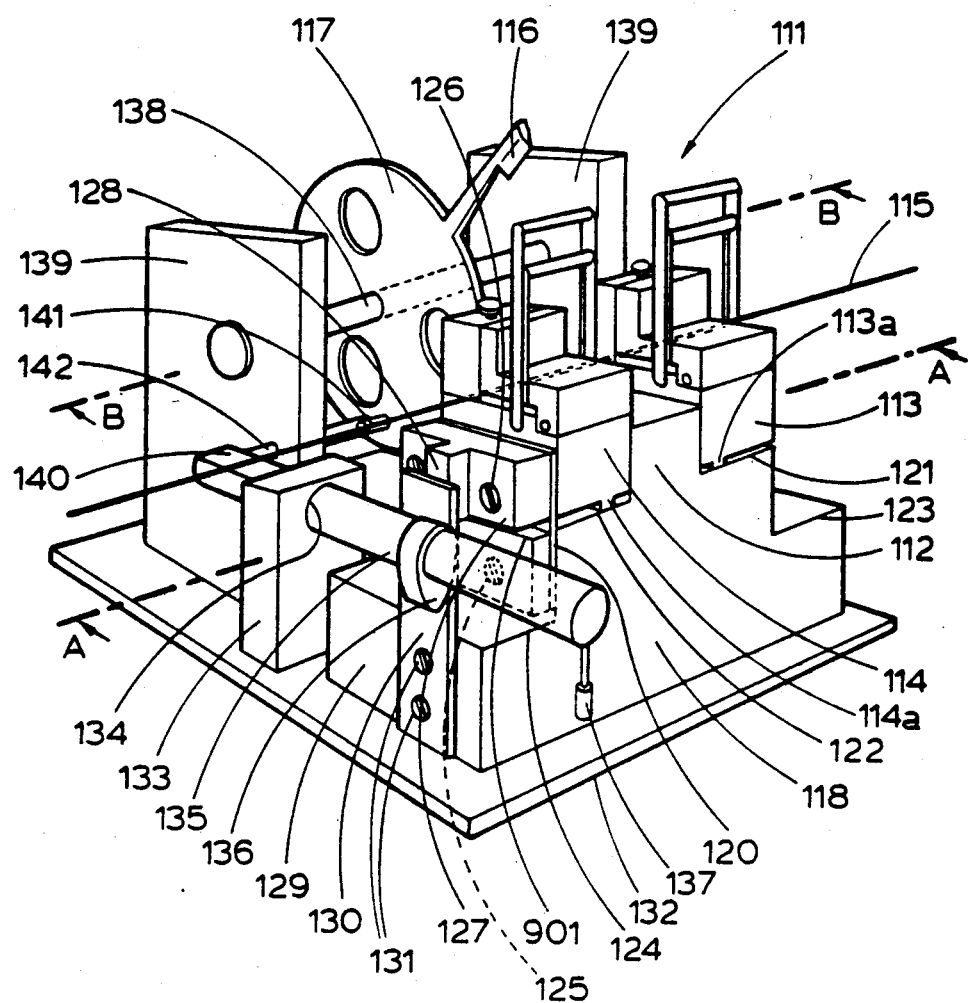
FIG. 1 shows a perspective view of the cleaving tool.
Figure 2:
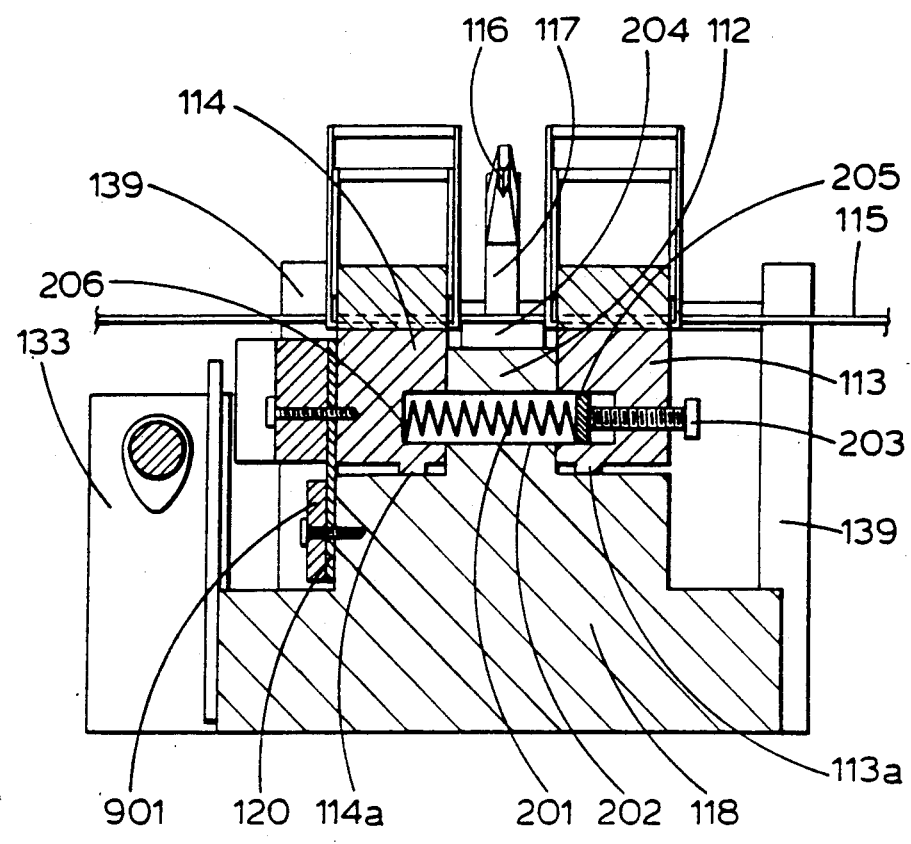
FIG. 2 shows a cross section taken along the line A—A in FIG. 1, viewed in the direction indicated by the arrows.

Referring to FIGS. 1 and 2, the cleaving tool 111 comprises an anvil 204, fibre clamps 113, 114 for clamping an optical fibre 115 such that it extends across the anvil, in contact with it, and a cleaver blade 116 which is mounted on a wheel 117.

A single support block 118 provides mounting for both the anvil 204 and for each of a pair of optical fibre clamps 113, 114. The support block 118, which is mounted on a base plate 132, has a central portion 112 flanked on each side by two downward steps 121 and 123, 122 and 124.

Referring to FIG. 2, the anvil 204 is designed, as in other known forms of cleaving tool, to provide a support for an optical fibre 115 when the latter is struck. It comprises a block of material mounted on the central portion 112 of the support block 118. To each side of the anvil 204 lies one of the fibre clamps 113, 114 and the anvil 204 is mounted such that, when an optical fibre 115 is mounted in position ready to be cleaved, the upper surface of the anvil 204 is horizontal and tangential to the bottom of the fibre 15. The anvil 204 is mounted on the support block 118 by adjustable mounting means (not shown) so that, if necessary, the height of the anvil can be adjusted.

The clamps 113, 114 shown are of a type known for use in clamping optical fibres and are not therefore described in detail. Briefly, each clamp operates by clamping the fibre, with a resilient pad, into a straight groove in a clamping face.

Referring again to FIG. 1, the clamps 113, 114 are mounted to each side of the central portion 112, on the first downward steps 121, 122. One of the clamps 113 is mounted so as to be immobile with respect to the support block 118. The other of the clamps 114 however is mounted by means of a leaf spring 120. The leaf spring 120 extends adjacent to both the side of the clamp 114 and the side of the step 122, and is attached by means of screws 125, 126 to both. The screws 125,126 do not act directly on the leaf spring 120. The upper part of the spring 120 is sandwiched between a pressure block 127 (further described below) and the fibre clamp 114 while the lower part of the spring 120 is sandwiched between a clamping plate 901 and the step 122. This arrangement avoids the leaf spring 120 being bent, in use, about an axis weakened by screw holes and so improves the reliability of the apparatus.

It is important that the clamping faces of the clamps 113, 114 are co-planar when the apparatus is set prior to cleaving a fibre 115 (as in FIGS. 1 and 6a). This is achieved by machining the two steps 121, 122 at exactly the same height, and by using clamps 113, 114 with identically sized bodies. Each clamp 113, 114 is supported on its respective step 121, 122 by means of a nib 113a and 114a across its base. It is ensured that these nibs 113a, 114a bear down onto the steps 121, 122 before the first clamp 113 is attached to the support block 118 and before the leaf spring 120 (which determines the position of the second clamp 114) is attached to the second clamp 114 and the support block 118. Similar precautions must be taken to ensure that the grooves of the two clamps 113, 114 are exactly collinear when the apparatus is set as in FIG. 1.

In the arrangement shown, with an optical fibre 115 clamped over the anvil 204 by the two fibre clamps 113, 114, both clamps 113, 114 are held upright by the fibre 115 itself and the leaf spring 120 extends vertically. However, the leaf spring 120 at rest is in the form of a curved resilient plate. The spring 120 is mounted such that if its upper end were released it would move in a direction away from the fixed clamp 113. Hence, in the arrangement of FIG. 1, the leaf spring 120 exerts a force on the associated fibre clamp 114 in a direction away from the fixed clamp 113. This force is supplemented by an adjustable force provided by an internal spring.

Referring to FIG. 2, the internal spring 201 is mounted in a cavity 202 formed by a bore through the central portion 112 of the support block 118 which is extended by a recess in the inner side of each clamp 113, 114. The recess in the resiliently mounted clamp 114 is of fixed length and is terminated by a bearing face 206 against which one end of the spring 201 bears. The recess in the fixed clamp 113 however is of adjustable length, being terminated by a movable bearing plate 205. The position of the bearing plate 205 can be adjusted to produce a preselected degree of compression in the spring 201 and hence a preselected supplementary force acting to separate the two fibre clamps 113, 114.

A screw 203 serves to adjust the position of the bearing plate 205. The screw 203 extends through a threaded bore in the fixed clamp 113 so that its shaft abuts the bearing plate 205 on the side away from the spring 201 and its head is exposed to allow adjustments to be made.

The optimal value of the total force available to act on the fibre varies with the particular type of fibre to be cleaved. It is extremely important, in achieving cleaved fibre ends of high quality, that the value selected is a correct one. Suitable value ranges are known to those skilled in the art and are not therefore detailed here.

It is important that debris does not interfere with the position of the spring mounted clamp 114 by finding its way between the clamp 114 and the central portion 112 of the support block 118. To avoid such interference, the face of the clamp 114 adjacent the central portion 112 is recessed, only its upper and side margins remaining (not shown). This allows the position of the clamp 114 to be determined accurately when it lies against the central portion 112 while debris will be able to fall harmlessly into the recess. The use of the nibs 113a, 114a underneath the clamps 113, 114 has a similar advantage.

Referring again to the FIG. 1, adjacent to the upper part of the leaf spring 120 and acting, with the resiliently mounted clamp 114, to sandwich that part of the leaf spring 120, is a pressure block 127. The pressure block 127 is a block of rigid material with a central projection 128 on its outer vertical face. The surface of the projection 128 which lies furthest from the clamp 114 extends short of the plane of the outermost vertical face 129 of the suport block 118. On either side of the central projection 128 lie screws 126, mentioned above in connection with the leaf spring 120. These screws 126 pass through the pressure block 127 and the leaf spring 120 to be held by threaded recesses in the clamp 114, thereby holding these three components rigidly together.

Mounted on the outermost vertical face 129 of the support block 118, parallel to the central projection 128, is a resilient contact plate 130. The contact plate 130 is in the form of a leaf spring which is fixed at its lower end by means of screws 131 to the outermost face 129 of the support block 118. The plate 130 extends vertically upwards in its relaxed state, as far as the upper part of the central projection 128. With the plate 130 unstressed, there is therefore a gap between it and the central projection 128.

In the region of the contact plate 130 there is provided a horizontal control shaft 135. The shaft 135 is rotatably mounted in a support 133 and has a turning handle 137 at one end. Adjacent to the contact plate 130 there is provided a cam 136 on the control shaft 135. The control shaft 135 is positioned such that the cam 136, when turned towards the contact plate 130, (i.e. when the shaft 135 is turned anticlockwise through 90° from the position shown in FIG. 1) impinges on the outer surface of the contact plate 130 and bends it in the direction of the clamps 113, 114. This action is further described below.

The wheel 117 and cleaver blade 116 are arranged as follows. Extending in a direction parallel to that of the optical fibre 115 is an axle 138. The wheel 117, which comprises a disc of material, is fixedly mounted on the axle 138, each end of which is supported by an axle support block 139 which is mounted on the base plate 132.

Figure 3:
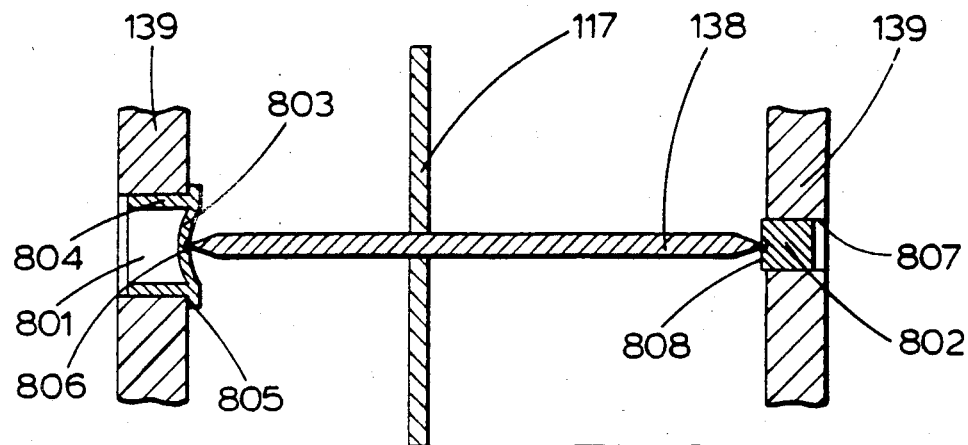
FIG. 3 shows a cross section taken along the line B—B in FIG. 1, viewed in the direction indicated by the arrows.

Referring to FIG. 3, bearings 801, 802 are provided in the axle support blocks 139. A first of these bearings 801 comprises a diaphragm 803 having an integral annular stem 804. The diaphragm 803 is seated by means of a shoulder 805 in an aperture in the support block 139. The end of the axle 138 rests in a blind hole 806 in the diaphragm. At the other end of the axle 138 there is provided a solid plug with a central blind hole 808 which takes the remaining end of the axle 138. Both ends of the axle 138 are conically tapered and each is supported at a short distance from its tip by the margin of its respective blind hole 806, 808. Both bearings 801, 802 are constructed out of a low friction plastics material such as TORLON.

To assemble the axle 138 in its bearings 801, 802, a first end is mounted in the diaphragm bearing 801, in position. The second, plug bearing 802 is then slid into position through a bore 807 in its respective support block 139 and fixed in place by means of a screw (not shown). The second bearing 802 is positioned so as to impose a preload on the diaphragm 803.

This arrangement has the advantage that it compensates for differences in thermal expansion or contraction between the base plate 132 and the axle 138 which could otherwise affect the action of the cleaver blade 116, particularly where the apparatus is used in extremes of temperature. Further, the preload in the diaphragm 803 acts to compensate for wear in the bearings, 801,802.

Figure 4:
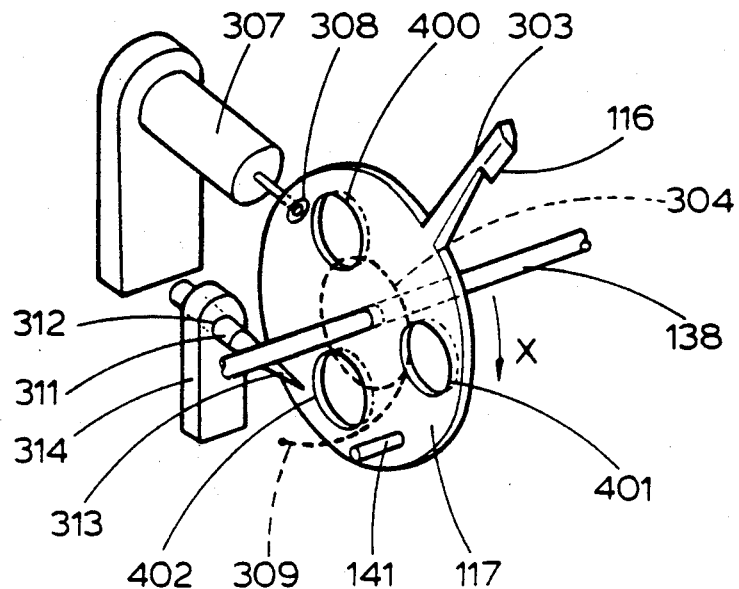
FIG. 4 shows a perspective view of part of the cleaving tool shown in FIG. 1.

Referring to FIG. 4, the wheel 117 comprises a circular disc. Extending radially from its circumference is an arm 303 which carries the cleaver blade 116. The arrangement is such that rotation of the wheel 117 would cause the cleaver blade 116 to strike an optical fibre in position on the anvil when the blade 116 extends substantially horizontally.

A hair spring 304 (shown schematically), mounted on the axle 138, acts to rotate the wheel 117. When the cleaver blade 116 is raised, as shown in FIG. 4, the spring 304 is tensioned with respect to its rest position and therefore exerts a turning force on the wheel 117, in the direction shown by the arrow X.

The magnitude of the force exerted can be adjusted by altering the position at which an end 309 of the spring 304 is clamped. That is, the end 309 can be pulled further through, or further out of, the relevant clamping means, so tightening or loosening the turns of the spring 304 on the axle 138.

An adjustable damper 307 is provided which acts via a projection 308 on the wheel 117 to damp its rotation during use of the cleaving tool. The damper 307 controls the rotational speed, and therefore the kinetic energy, of the cleaver as the blade 116 strikes the fibre (not shown). This, as is already known in the art, affects the quality of the cleaved fibre end produced.

Figure 5:
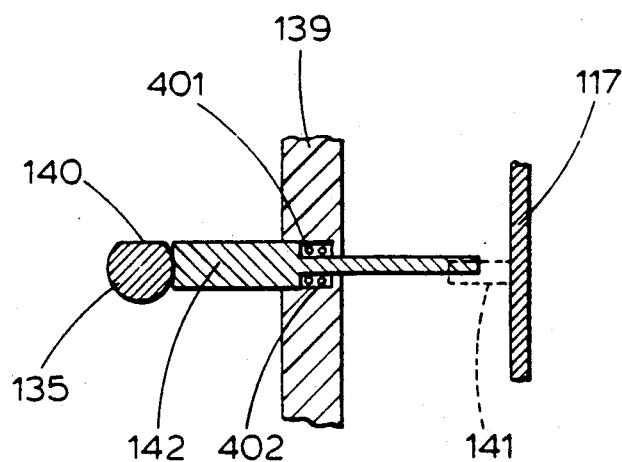
FIG. 5 shows a cross section of a pin for use in the cleaving tool of FIG. 1.

Referring to FIGS. 1 and 5, the control shaft 135 extends beyond its support 133 on the side away from the contact plate 130. The extended portion of the control shaft 135 is provided with a simple cam profile by means of a flat 140 which is directed when the apparatus is set, as shown, away from the wheel 117. A spring mounted pin 142 co-operates with said cam profile, and with a projection 141 on the face of the wheel 117, to control rotation of the wheel 117 in the direction of the turning force exerted by the hair spring 304, in a manner further detailed below.

Referring to FIG. 4, extending horizontally and parallel to the face of the wheel 117 which carries the projection 141 there is mounted a stop 311. The stop 311 has a cylindrical portion 312 with a threaded external surface and a conically tapered point 313. The stop 311 is screwed by means of its threaded portion into a threaded bore in a support 314. The tapered point 313 is directed towards the fibre clamps (not shown) and lies closer to the wheel 117 than does the end of the projection 141.

The wheel 117, and all the parts to which it is fixedly attached, is balanced about the axis of the wheel bearing axle 138. Compensation for the lack of rotational symmetry of the wheel 117 and the attached parts is provided by holes 400, 401, 402 which are cut through the wheel 117.

A second aspect of the compensating holes 400, 401, 402 is that they can be used to determine the mass and therefore the inertia of the wheel 117 and the parts to which it is fixedly attached. This inertia is an important factor in the cleaving characteristics of the cleaving tool, as is known to those skilled in the art, and will be selected as required.

The cleaving apparatus is used to cleave an optical fibre 115 as described below, with reference to FIGS. 6a to 6c.

The portion of the optical fibre 115 which is to be cleaved is prepared, for instance by removal of any protective layers it is necessary to remove. The preparation requirements for use of the cleaving apparatus described are not particular to the apparatus and will be clear to a person skilled in the art of cleaving optical fibres.

The wheel 117 is positioned with the arm 303 in a raised position, as shown in FIG. 6a, and the control shaft 135 is subsequently positioned so that the cam 136 projects horizontally, in the direction of the fibre clamps 113, 114. The wheel 117 is then maintained with the arm 303 raised by means of the projection 141 and the spring mounted pin 142. Further, the contact plate 130 is held against the central projection 128 of the pressure block 127 by the cam 136. The contact plate 130 acts via the central projection 128 to hold the resiliently mounted fibre clamp 114 in an upright position, equivalent to that of the fixed clamp 113, against the forces exerted by the leaf spring 120 and the internal spring 201 (FIG. 2).

The optical fibre 115 is placed in the fibre clamps 113, 114 so that the prepared portion of the optical fibre 115 lies across the anvil 204. It is important, as is known in the art, that the fibre 115 should not be placed under torsional strain in the clamps 113, 114. This can be aided by closing the clamp adjacent a short end of the fibre 115 only after closing the clamp. In this way, any torsional strain is released by rotation of the short end.

Referring to FIG. 6b, to set the apparatus prior to cleaving, the control shaft 135 is turned through 90° to bring the cam 136 to a position directed vertically downwards. The wheel 117 remains held in the same position by means of the pin 142. Both fibre clamps 113, 114 also remain in the same positions as before but the cam 136 no longer acts via the contact plate 130 and pressure block 127 to oppose the forces exerted by the leaf spring 120 and internal spring 201 (FIG. 2). Instead the contact plate 130 comes away from the pressure block 127 and the optical fibre 115 itself, being clamped at fixed positions by the two fibre clamps 113, 114, prevents the resiliently mounted clamp 114 from moving away from the fixed clamp 113.

The optical fibre 115 is therefore brought under a longitudinal tension determined by the forces exerted by the leaf spring 120 and the internal spring 201 (FIG. 2).

Referring to FIG. 6c, to cleave the fibre 115, the control shaft 135 is then turned through a further 90°. This turns the flat 140 on the extended portion of the control shaft 135 towards the spring mounted pin 142 which as a result can be displaced by its associated spring (not shown) away from the wheel 117, sufficiently to clear the projection 141 on the wheel 117. The wheel 117 is thus freed to rotate until the cleaver blade 116 strikes the optical fibre 115 on the anvil 204, thereby cleaving it.

The resiliently mounted clamp 114 will tilt away from the fixedly mounted clamp 113, under the combined actions of the leaf spring 120 and the internal spring 201 (FIG. 2) in the absence of the restraint hitherto provided by the intact optical fibre 115, into the position shown in FIG. 6c.

The cleaver blade 116 will penetrate into the optical fibre 115 to a distance related to the extent of rotation of the wheel 117 when the projection 141 contacts the stop 311. Rotation of the stop 311 in its support 314 results in horizontal displacement of the tapered point 313 across the face of the wheel 117. The diameter of the tapered point 313 where it is contacted by the projection 141 on rotation of the wheel 117 is varied as a result and consequently the maximum extent of rotation of the wheel 117, and penetration of the blade 116 into the fibre 115, are also varied.

It is known in the art that the extent to which the blade 116 can penetrate a fibre 115 has a major effect on the quality of cleaved fibre end produced. It is also known that that extent will vary between fibre types. Good quality fibre ends have been produced in monomode fibres of diameter 125 $\mu$m where the stop 311 was set such as to allow the blade 116 to reach a position 5 $\mu$m below the upper surface of the fibre 115. However it will be understood that the position of the stop will be peculiar to each fibre type and must be set accordingly.

Regarding the tensile load applied to the fibre 115 before cleaving, although in practice the tension is applied by a member which travels along a curve when released (generated by the tilting movement of the resiliently mounted clamp 114), it will be clear that the tension which is applied to the fibre 115 before cleaving is axial. Although the fibre 115 takes a finite time to cleave completely, and during that finite time the clamp 114 will start to tilt, the deviation from an axial load which is introduced should be insignificant. The shallower the curve introduced by the tilting movement of the resiliently mounted clamp 114, the closer will be the approximation to an axially applied tension thhroughout the cleaving action. Although it is considered that the distance between the fibre and the screws 125 which mount the leaf spring 120 on the support block 118 could be considerably reduced, the distance in the embodiment described above is about 2.5 cm.

The arrangement described offers a number of advantageous features in the cleaving of optical fibres. In particular, the movement of the cleaver blade 116 is independent of gravity and will not be affected by gravitational forces due to changes in orientation of the apparatus. There is no necessity therefore to mount the apparatus on a horizontal surface or to allow for changing gravitational forces which might occur for instance on board a ship. It should be noted, particularly in this respect, that although the cleaving tool described above, and shown in the Figures, is oriented such that the optical fibre is struck from above, this is not a necessary orientation of a cleaving tool according to the invention.

It will be clear that many alternative arrangements would produce the same advantageous feature, including replacement of the wheel by a rod carrying a cleaver blade at one end. Further, whatever means is used to balance the cleaver, that is the cleaver blade and everything that rotates with it in use, may be applied to any part of the cleaver. Therefore the holes 400, 401, 402 described above may be replaced for instance by recesses in the rotatable axle 138, or by suitable weights mounted on the wheel 117 or axle 138.

It should be noted that the wheel 117 is fixedly mounted on an axle 138 whose length is comparable with the distance between the cleaver blade 116 and the axis of rotation of the cleaver. In the present embodiment the axle 138 is about 2.5 cm long and the distance between the blade 116 and the axis of rotation is about 3.5 cm. The cleaver, in this case comprising the wheel 117 and axle 138 together, is therefore supported at two points which are spaced relatively far apart, that is, at the ends of the axle 138. This is advantageous in that should displacement occur at the associated bearings, for instance due to wear in spite of the preloaded diaphragm 803, then any resulting displacement of the cleaver blade 116 due to tilting of the wheel 117 will tend to be small. In comparison, were the wheel 117 for example to be rotatably supported on the axle 138 then the same amount of wear in the associated bearings would cause the wheel 117 to tilt relative to the axle 138 to a much greater degree, generating much greater displacement of the cleaver blade 116.

By designing the control shaft 135 so that its rotation acts first to apply tension to the fibre 115 and then to release the wheel 117, causing cleaving of the fibre 115, the arrangement described is particularly simple to operate. The arrangement may also be modified so that in moving the control shaft back to its starting point, with the cam 136 holding the contact plate 130 against the pressure block 127, the wheel 117 is similarly moved back to its starting point with arm 303 raised, without any further action being taken.

It will be clear that other features of the cleaving apparatus described above are not essential. For instance the internal spring 201 could be left out and the force exerted by the resilient mounting of the resiliently mounted fibre clamp 114 designed to be adjustable.

We claim:

1. A method of cleaving an optical fibre on a cleaving apparatus including means for cleaving said optical fibre, said means for cleaving including a cutting blade; an anvil; clamping means for clamping the optical fibre to the anvil, said means for clamping including means for exerting an axial tension on a clamped fibre, said method for cleaving comprising the steps of:
   maintaining the cutting blade is a secured position away from the anvil;
   disabling the means for exerting an axial tension included in the means for clamping;
   placing the fibre in the clamping means and securely clamping the fibre to the anvil;
   enabling the means for exerting an axial tension on the fibre to thereby place the fibre under an axial tension while maintaining the cutting blade a distance away from the anvil;
   releasing the cleaving means; and
   rotating the cleaving means about its center of gravity and driving the cutting blade to cleave the fibre.

2. A method for cleaving according to claim 1, wherein the cleaving apparatus is controlled by the step of rotating a lever arm between three control positions for triggering the performance of the disabling, enabling and releasing steps.

3. A method for cleaving according to claim 1, wherein the step of rotatably driving includes the steps of driving by a coiled hair spring and adjusting the tension of the hair spring to alter the driving force applied to rotate the cleaver.

4. A method for cleaving according to claim 1 further including controlling the rotational speed of the cleaver by a damping means.

5. A method for cleaving according to claim 1, wherein the cleaver comprises a disc mounted on an axle and wherein the method further includes the step of disposing the cutting blade on the periphery of the disc.

6. A method for cleaving according to claim 5, including the step of locally varying the mass distribution of the disc to balance the cleaver about the axle.

7. A method for cleaving according to claim 6, wherein the disc is perforated to locally vary the mass distribution to thereby balance the cleaver about the axle.

8. A method for cleaving according to claim 1 including the steps of applying axial tension to the optical fibre by a pair of optical fibre clamps, one hingedly separable from the other, and applying a force which acts to separate the clamps.

9. A method for cleaving according to claim 8, including the step of applying a force to separate the clamps using a leaf spring.

10. A method for cleaving according to claim 1, adjustably limiting the penetration of the cleaver blade into the optical fibre.

11. A method for cleaving according to claim 10 providing the cleaver with a projection to contact a stop means to limit the penetration of the cleaver blade into the optical fibre.

12. Optical fibre cleaving apparatus comprising an anvil, clamping means for clamping an optical fibre onto the anvil, a cleaver including a blade for cleaving said fibre on said anvil, means for mounting said cleaver to rotate about its center of gravity, and driving means for rotating the cleaver so that the blade strikes the fibre.

13. Optical fibre cleaving apparatus according to claim 12 further provided with stop means comprising a conically tapered rod which is screw-mounted such that its position in an axial direction is adjustable, said stop means being positioned to arrest the rotation of the cleaver, to thereby adjustably limit the penetration of the cleaver blade into the optical fibre.

14. Optical fibre cleaving apparatus according to claim 13, wherein the cleaver is provided with a projection to contact the stop means, to thereby limit the penetration of the cleaver blade into the optical fibre.

15. Optical fibre cleaving apparatus according to claim 12 further including adjustable damping means for controlling the rotational speed of the cleaver.

16. Optical fibre cleaving apparatus according to claim 12, wherein the cleaver comprises a disc mounted on an axle and the blade of the clever is disposed on the periphery of the disc.

17. Optical fibre cleaving apparatus according to claim 16, wherein the cleaver is balanced about the axle by locally varying the mass distribution of the disc.

18. Optical fibre cleaving apparatus according to claim 17, wherein the disc is perforated to locally vary the mass distribution to thereby balance the cleaver about the axle.

19. Optical fibre cleaving apparatus according to claim 12, wherein the cleaver is mounted to rotate in bearings which are spaced apart a distance substantially equal to the distance between the blade of the cleaver and the center of gravity of the cleaver.

20. Optical fibre cleaving apparatus according to claim 12, wherein the cleaver is mounted in a bearing comprising a diaphragm constructed out of low friction plastics material, the cleaver being mounted in a recess in a major face of the diaphragm.

21. Optical fibre cleaving apparatus according to claim 12 further provided with means for applying axial tension to the optical fibre comprising a pair of optical fibre clamps, one hingedly separable from the other, and means for applying a force which acts to separate the clamps.

22. Optical fibre cleaving apparatus according to claim 21, wherein the means for applying a force to separate the clamps comprises a leaf spring.

23. Optical fibre cleaving apparatus according to claim 12, wherein the driving means comprises a coiled hair spring and means for adjusting the tension of the hair spring to thereby alter the driving force applied to rotate the cleaver.

24. Optical fibre cleaving apparatus comprising:
    cleaving means for cleaving an optical fibre, said means for cleaving including a cutting blade;
    an anvil;
    clamping means for clamping an optical fibre to the anvil, said clamping means including means for exerting an axial tension on said fibre;
    means for mounting said cleaving means for rotating said cleaving means about its center of gravity;
    driving means for rotating the cleaving means; and
    control means for controlling the position of said cutting blade, said control means including
    (a) means for disabling said means for exerting an axial tension and for maintaining said cutting blade a distance away from said optical fibre;
    (b) means for enabling said means for exerting an axial tension while maintaining said cutting blade a distance away from said optical fibre; and
    (c) means for releasing said cutting blade so that it is freed to cleave said optical fibre which is clamped to said anvil.

25. Optical fibre cleaving apparatus according to claim 24, wherein said control means includes means movable into first, second and third control positions, for triggering said means for disabling in said first control position, said means for enabling in said second control position and said means for releasing in said third control position.

26. Optical fibre cleaving apparatus according to claim 24 further including stop means comprising a conically tapered rod which is screw-mounted such that its position in an axial direction is adjustable, said stop means being positioned to arrest the rotation of the cleaving means, thereby to adjustably limit the penetration of the cutting blade into the optical fibre.

27. Optical fibre cleaving apparatus according to claim 26, wherein the cleaving means includes a projection to contact the stop means, to thereby limit the penetration of the cutting blade into the optical fibre.

28. Optical fibre cleaving apparatus according to claim 24, wherein said control means includes a control shaft having a cam mounted thereon, said cam being positionable in at least a first position to bear against said means for clamping to prevent axial tension from being exerted and in a second position to release said means for clamping to enable said axial tension to be exerted on said fibre.

29. Optical fibre cleaving apparatus according to claim 24, wherein said driving means includes a coiled hair spring and means for adjusting the tension of the hair spring to thereby alter the driving force applied to rotate the cleaving means.

30. Optical fibre cleaving apparatus according to claim 25 further including adjustable damping means for controlling the rotational speed of the cleaving means.

31. Optical fibre cleaving apparatus according to claim 24, wherein the cleaving means comprises a disc mounted on an axle and the blade of the cleaving means is disposed on the periphery of the disc.

32. Optical fibre cleaving apparatus according to claim 31, wherein the cleaving means is balanced about the axle by locally varying the mass distribution of the disc.

33. Optical fibre cleaving apparatus according to claim 32, wherein the disc is perforated to locally vary the mass distribution thereby to balance the cleaving means about the axle.

34. Optical fibre cleaving apparatus according to claim 24, wherein the means for mounting includes bearings which are spaced apart a distance substantially equal to the distance between the blade of the cleaving means and the center of gravity of the cleaving means.

35. Optical fibre cleaving apparatus according to claim 24, wherein the means for mounting includes a bearing comprising a diaphragm constructed out of low friction plastics material, the cleaving means being mounted in a recess in a major face of the diaphragm.

36. Optical fibre cleaving apparatus according to claim 24, wherein the means for applying axial tension to the optical fibre comprises a pair of optical fibre clamps, one hingedly separable from the other, and means for applying a force which acts to separate the clamps.

37. Optical fibre cleaving apparatus according to claim 36, wherein the means for applying a force to separate the clamps comprises a leaf spring.

* * * * *